No. 818,395. PATENTED APR. 17, 1906.
G. L. SMITH.
MAGAZINE FIREARM.
APPLICATION FILED SEPT. 6, 1901.
7 SHEETS—SHEET 5.
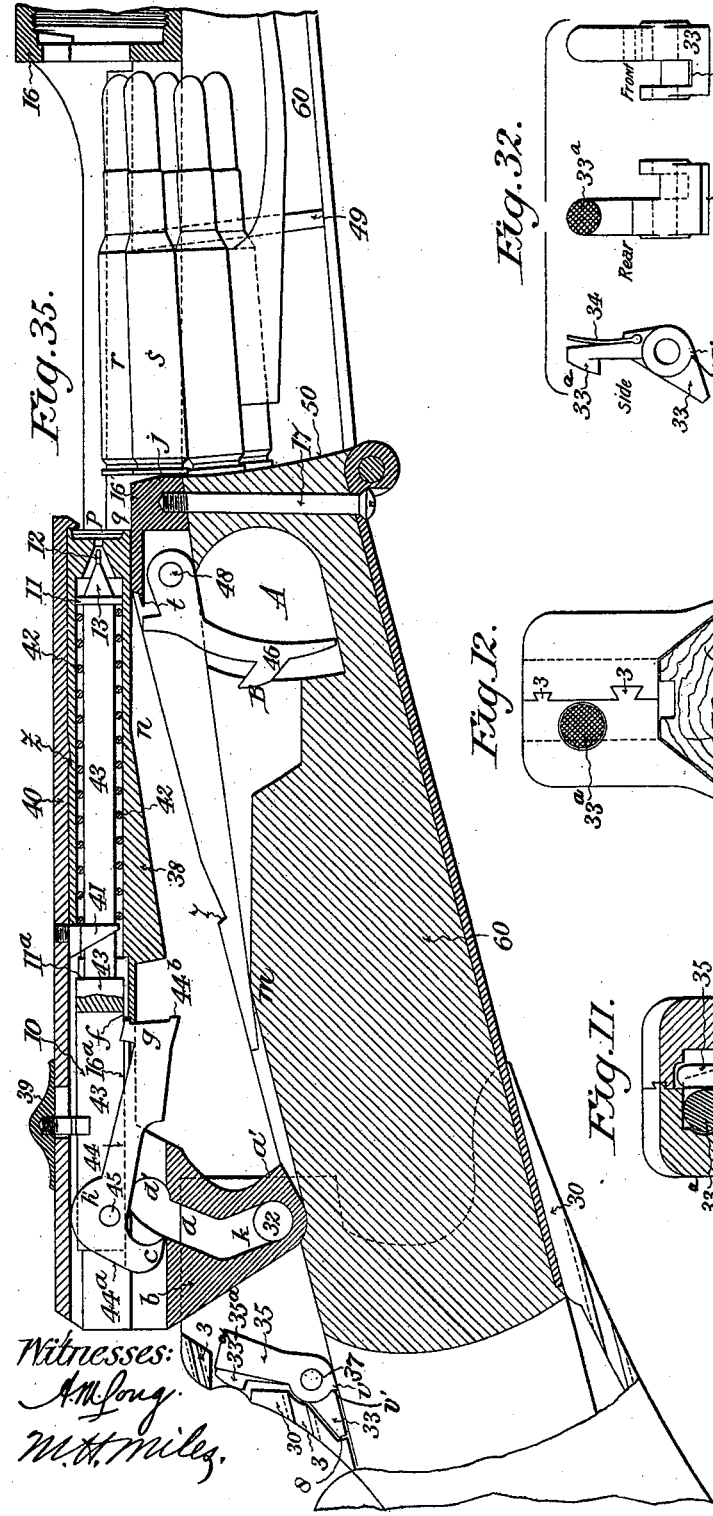
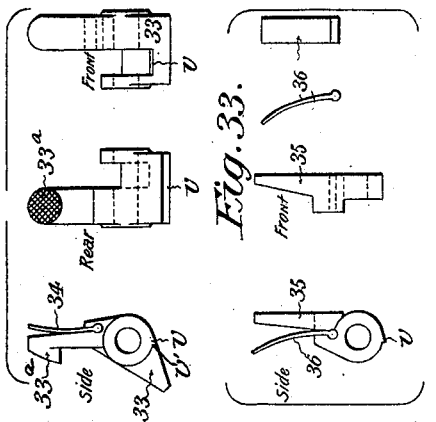
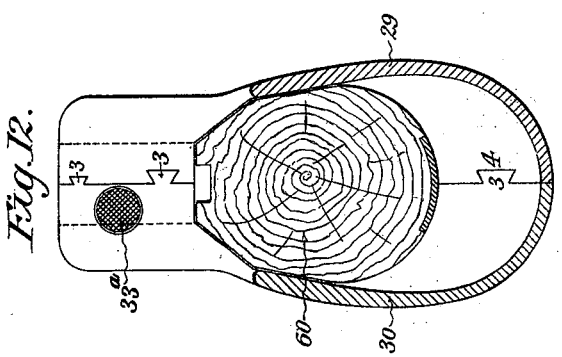
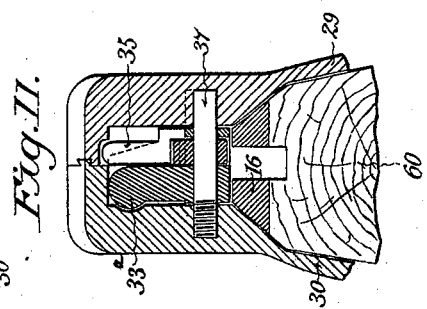

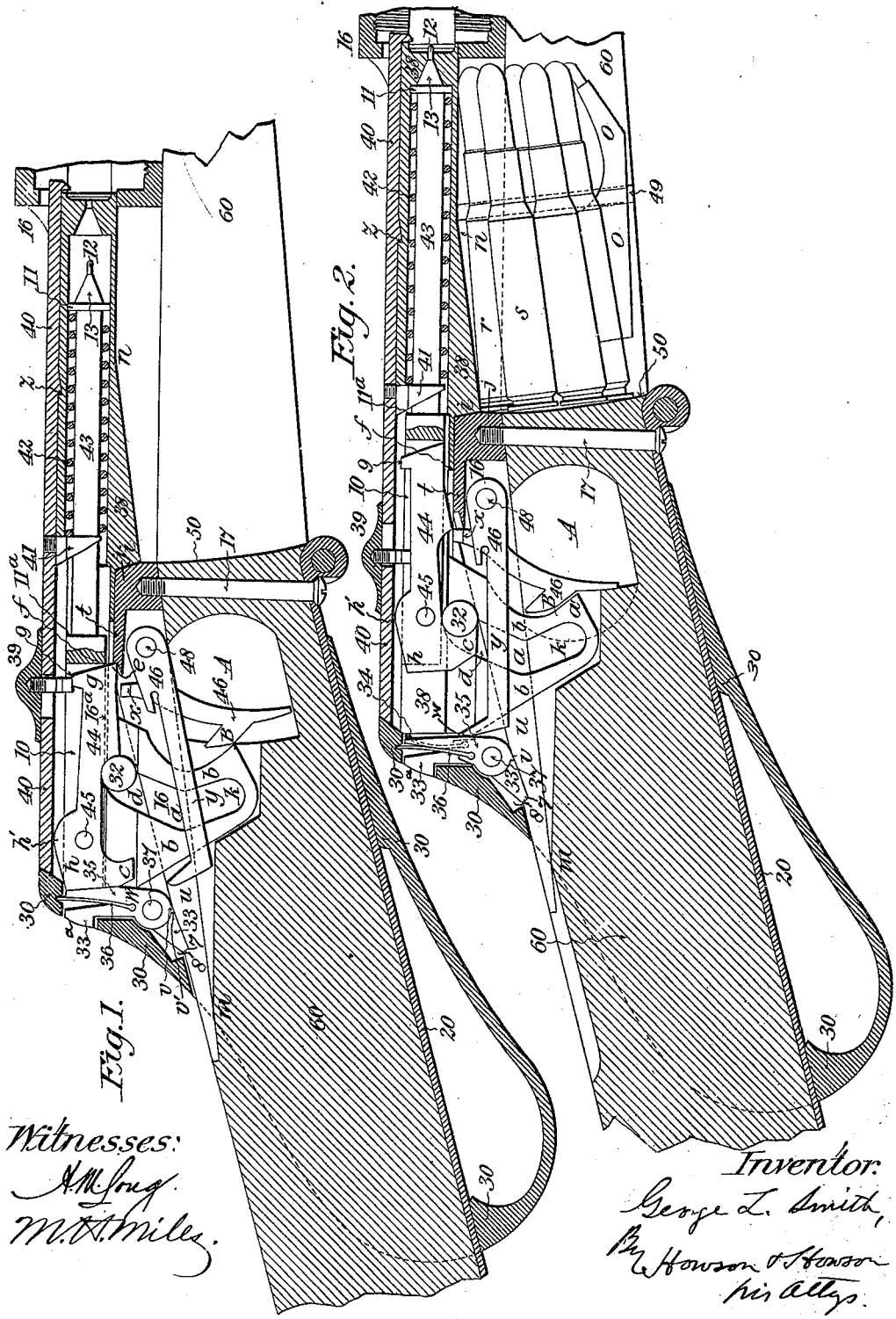

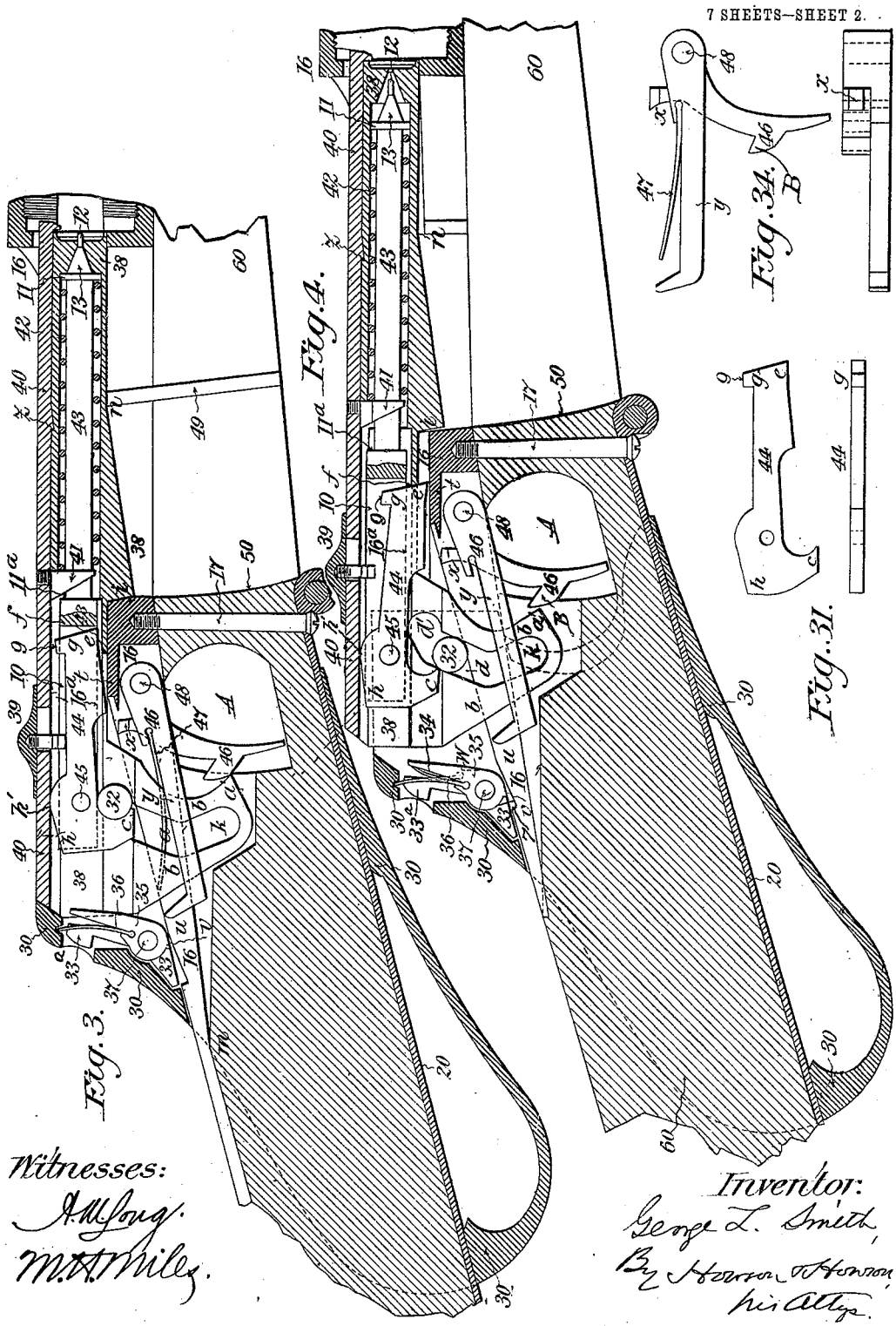

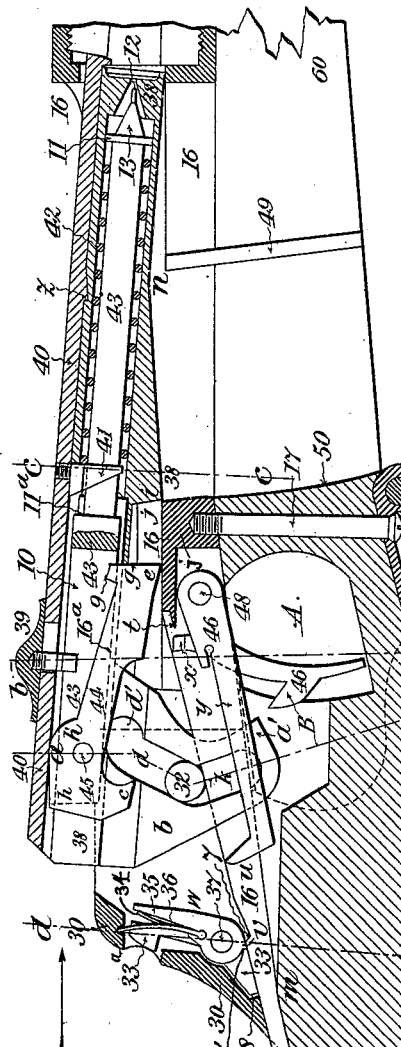

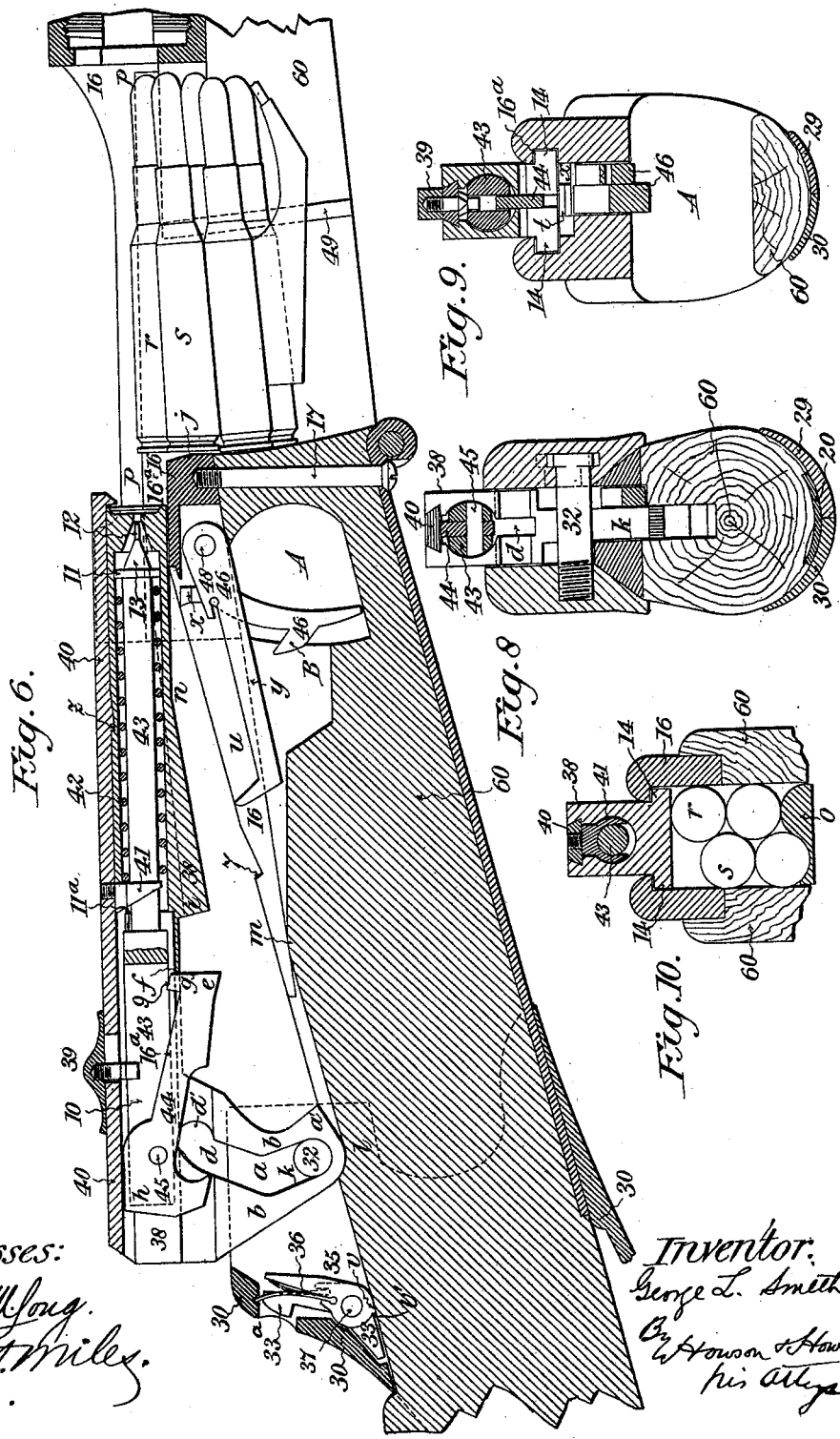

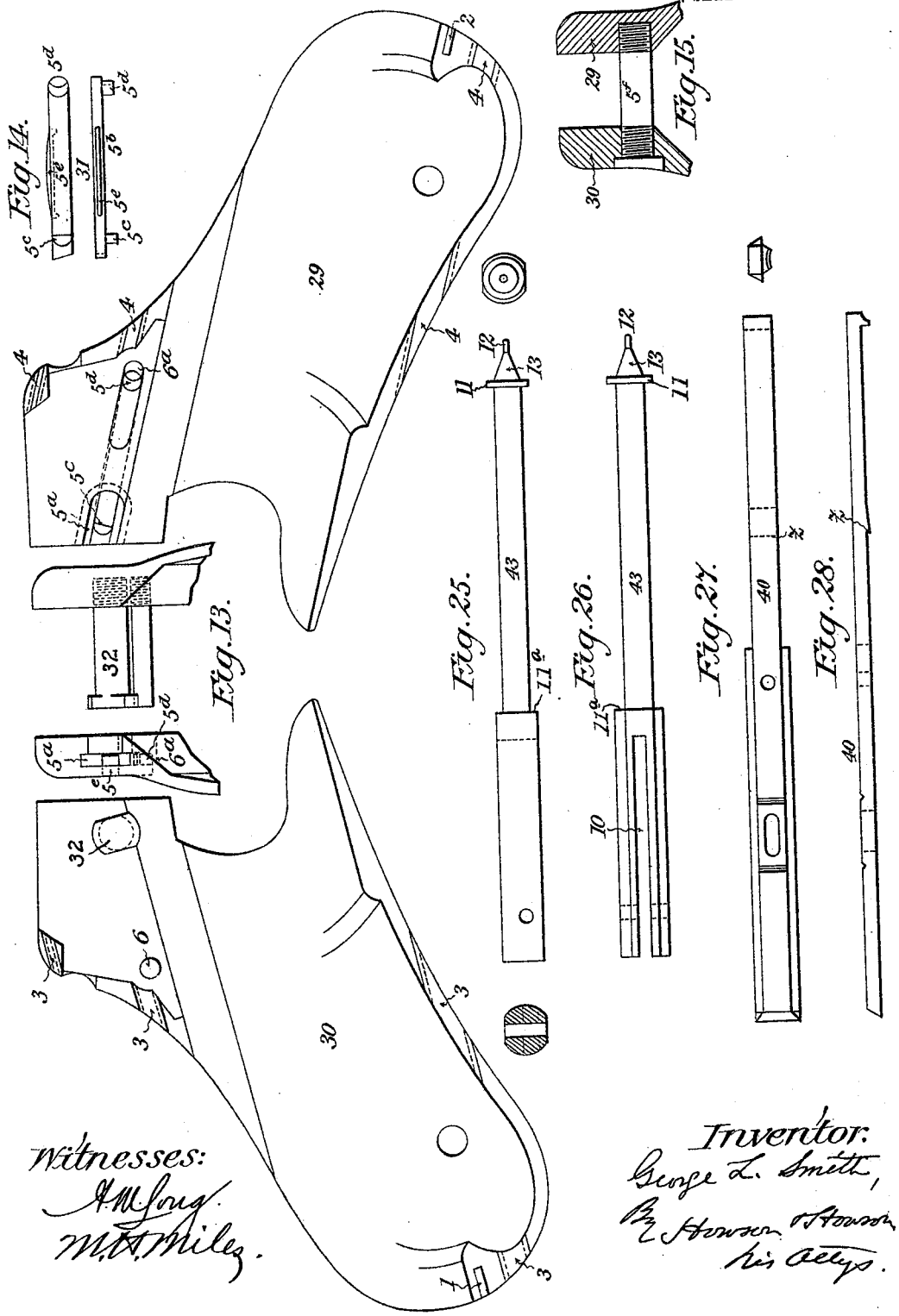

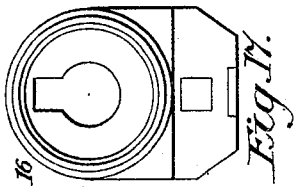
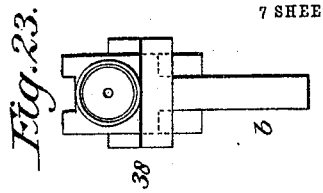
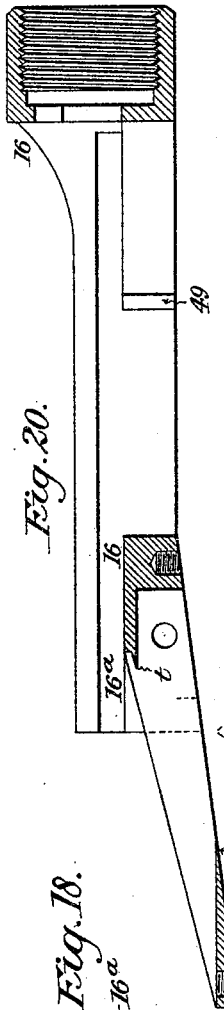
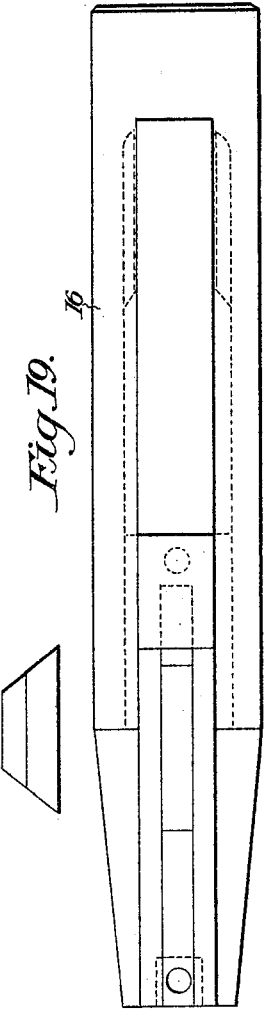
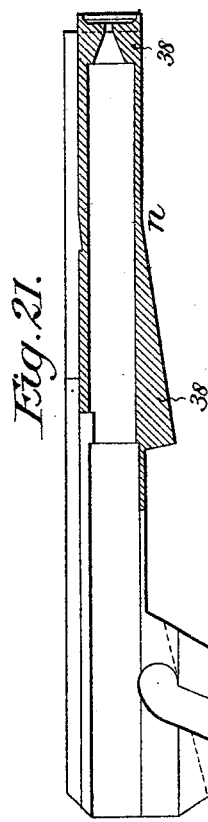
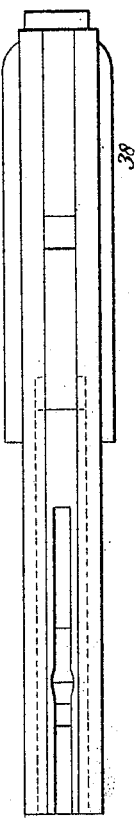
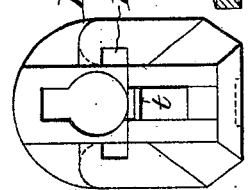
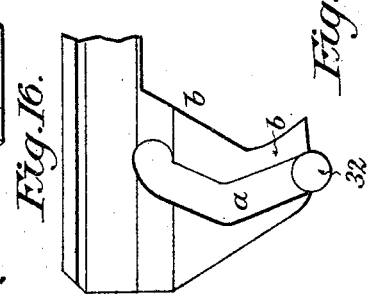

UNITED STATES PATENT OFFICE.

GEORGE L. SMITH, OF THE UNITED STATES NAVY.

MAGAZINE-FIREARM.

No. 818,395.          Specification of Letters Patent.          Patented April 17, 1906.

Application filed September 6, 1901. Serial No. 74,587.

*To all whom it may concern:*

Be it known that I, GEORGE L. SMITH, ensign United States Navy, a citizen of the United States, have invented certain new and useful Improvements in Breech-Loading Firearms, of which the following is a specification.

My invention relates to improvements in the breech mechanism of breech-loading guns, and especially to certain improvements in the breech mechanism of that type of firearms known as "magazine-guns."

My objects are to so construct the breech mechanism of breech-loading guns, and particularly of magazine-guns, that the operation of loading, unloading, and firing shall be performed in a more efficient manner and with greater safety and rapidity than has been heretofore possible in guns of the type designated; to provide such a mechanism in which the number of parts shall be reduced to a minimum and in which the motions transmitted to the parts for the various functions intended shall be the simplest, most direct, and positive; and a further object of my invention is to so construct and dispose the elements of the breech mechanism that there shall be no angular and projecting parts beyond the stock and by which the position of the hand in operating the mechanism for performing the various functions of loading, firing, &c., shall be the most natural and easy, thus avoiding the necessity of frequent changes of position of the hand while the gun is in action. A further object is to provide a breech mechanism which shall be capable of being dismantled and assembled with the greatest facility and by which the operations of charging the magazine and loading the barrel shall be accomplished in the quickest and most expeditious manner; and a further object is to provide efficient means for preventing accidental discharge of the cartridge or movement of the firing-pin or its operating mechanism at any other time than that at which it is designed to be moved in order to explode the charge in the cartridge—*i. e.*, when the parts are in the proper position for firing—and, lastly, my object is to so construct and arrange the various parts that their proper action shall be insured at the instant demanded and by which a gun possessing the essential characteristics of ease of operation and facility of assembling and disassembling, simplicity, minimum number of parts, and safety are secured.

With these objects in view my invention consists of the novel construction of breech mechanism and its several constituent parts and the arrangement and details thereof, as hereinafter described and claimed, with reference to the accompanying drawings, in which—

Figure 1 is a longitudinal section, with parts in elevation, of the breech portion of a magazine-gun, showing my invention applied thereto, with breech-bolt closing the gun and ready for firing. Fig. 2 is a similar view, with side of magazine cut away, showing cartridges in position, the parts being shown in position as the trigger is pulled and before the finger has released the same. Fig. 3 is a similar view showing position of parts after the trigger has been released. Fig. 4 is a similar view showing parts when the firing-pin point is withdrawn from the face of the bolt. Fig. 5 is a similar view showing parts unlocked to permit withdrawal of breech-bolt. Fig. 6 is a similar view showing position of parts when the breech-bolt is entirely withdrawn. Fig. 7 is a similar view showing the position of the parts when the bolt is completing its last forward movement to close the breech and with the sear holding the firing-pin to the rear for cocking. Fig. 8 is a transverse sectional view taken on the line *a a*, Fig. 5. Fig. 9 is a similar view on the line *b b*, Fig. 5. Fig. 10 is a similar view on the line *c c*, Fig. 5. Fig. 11 is a similar view on the line *d d*, Fig. 5. Fig. 12 is a similar view on the line *e e*, Fig. 5. Fig. 13 is a detail view of the preferred form of pistol-grip. Fig. 14 is a similar view of a lock therefor. Fig. 15 is a detail view of modified form of grip and lock. Fig. 16 is a detail view of modified form of cam-slot on breech-bolt. Figs. 17 to 20 are front, rear, top plan, and longitudinal sectional detail views, respectively, of the receiver. Figs. 21 to 24 are longitudinal, top plan, front, and rear detail views, respectively, of the breech-bolt. Figs. 25 and 26 are detail views of the firing-pin. Figs. 27 and 28 are similar views of the extractor. Figs. 29 to 34 are detail views of various parts hereinafter referred to. Fig. 35 is a sectional elevation of a modification.

Referring now to the drawings, in which the same reference characters relate to the same or corresponding parts in all the views, the numeral 16 indicates the receiver above the magazine, and extending rearwardly therefrom through the upper part of the small of the stock 60 in the bottom of said receiver is a slot $q$, flanked by flanges $p$. These flanges are so disposed that the cartridges, which are fed upward by a follower $o$, are successively held in the relative positions occupied by the cartridges $r$ and $s$, which form the uppermost ones in each of the two tiers of cartridges in the magazine, the cartridge $s$ being held just below the floor of the receiver, so as not to interfere with the movement of the breech-bolt 38 as the latter is moved forward, while the cartridge $r$ is held exactly in the line of movement of such bolt. The receiver 16 is secured to the stock by a screw-bolt 17, and the magazine is provided with a forward guide 49 and after guide 50, as shown in Fig. 2, which guides act to guide the cartridges in their upward movement toward the receiver.

The receiver is enlarged at the forward end and secured to the rear of the barrel by screw-threaded attachment or by other suitable means, and in the side walls of said receiver are grooves $16^a$, which extend a sufficient distance to the rear to properly guide the breech-bolt 38 through the medium of flanges or lips 14, projecting from each side thereof into said grooves as the said bolt is advanced and retracted in the manner hereinafter described, such movement of the bolt comprising a rearward one to open the breech, a lifting and a dropping movement, and the converse of such separate movements in closing the breech, the extent of which several movements determines the length and conformation of the said grooves.

The breech-bolt 38 is slidably mounted in a slot extending vertically through the receiver, the flanges 14, acting in conjunction with the grooves $16^a$, serving to support it in proper position, so that said breech-bolt will be in alinement with the axis of the cartridge and the barrel. A recoil-toe $i$ is formed on the lower side of the bolt, which toe engages a shoulder $j$ on the receiver structure or other fixed part, thereby locking the bolt rigidly in place when the breech is fully closed, as shown in Fig. 1. The under side of the breech-bolt is cut away, as shown at $n$, for a purpose hereinafter indicated. This bolt carries within a central bore a firing-pin 43, the forward end of which terminates in a conical portion 13, from which projects the firing-point 12, the end of the bore of the bolt conforming to the outer contour of the end of the firing-pin thus formed. A yoke 41 is carried by the extractor 40, the forks of which yoke embrace the firing-pin and form an abutment for one end of the mainspring 42, the other end of said spring being seated against a shoulder 11 at the forward end of the firing-pin. The firing-pin is enlarged in that portion surrounding the slot 10, the forward portion of which enlargement terminating in a shoulder $11^a$, which when the firing-pin point has been projected to its extreme forward position for exploding the charge occupies a position a slight distance from the inclined rear sides of the yoke 41, so as to permit the shoulder 11 and the conical portion 13 of the firing-pin to contact with the similarly-shaped portions of the bore in the breech-bolt.

Fulcrumed on a pin 45, extending across a slot 10, formed in the rear end of the firing-pin and extending downwardly through a slot $f$ in the lower side of the breech-bolt 38, is a sear 44, which is adapted to swing on said pin in the slot 10, and extending downwardly from the rear portion of the breech-bolt is a toe $b$, provided with a cam-slot $a$, said toe being adapted to slide vertically through a slot formed in the tail $u$ of the receiver 16 and in a recess $60^a$ in the stock 60, registering with said slot in the tail $u$. The sear being thus held in fixed relation to the firing-pin and the latter being under the influence of the mainspring 42, it will be seen that the mainspring is utilized, through the medium of the sear and firing-pin, in keeping the breech closed when the gun is not cocked.

Slidably mounted upon the stock 60 is a pistol-grip, the stock being provided with a friction-plate 20 on its under side, in contact with which plate the pistol-grip is adapted to move. The pistol-grip is preferably composed of two sections 29 and 30, united by a dovetailed joint which can be readily separated, so as to dismantle the parts. The preferred form of this pistol-grip is shown in Figs. 13 and 14, where it will be seen that the grip is formed in two sections 29 and 30, provided with dovetail connections, one of said sections having pins 32 and 6, which are adapted to slide in and engage corresponding slots $5^a$ and $6^a$ in the other section, thereby uniting the upper portions of the sections, while 3 indicates the tenons on one section, which fit corresponding mortises 4 on the other section, thus forming dovetailed joints, and to prevent one section from sliding beyond the other in assembling the two sections a feather 2 is formed on one section to engage with a recess 1 in the other, the end of the feather contacting with the end wall of the recess, and thus preventing one section from being moved beyond the proper point in assembling the grip. In order to lock the pins 32 and 6 in place, I provide a locking-bar $5^b$, having projecting lugs $5^c$ $5^d$, adapted to engage the pins 32 and 6 when the locking-bar is seated in a recess on the side of one section of the grip, as shown by dotted lines, Fig. 13, a spring $5^e$ acting to press the bar firmly to its seat. The lug $5^d$ is recessed to fit around one of the pins, while the other lug $5^c$ is squared to contact with the square side of the other pin. Instead of a dovetailed connection between the grip-sections they may be united by screw-threaded bolts or pins $5^f$, as shown in Fig. 15, one of which performs the function of the pin 32, above described, and in either of these cases the grip-sections may be readily dismantled, for it is only necessary to back out the locking-pin 5ᵇ, when the parts may be readily separated by sliding one section upon the other, in the one case, and, in the other, the bolt 5ᶠ is backed out, thus releasing the sections for the same purpose. I may also provide for dismantling the breech-bolt, &c., without disturbing the other parts by forming the slot $a$ open at the bottom, as shown in Fig. 16, wherein it will be seen that the pin 32 may be readily released from confinement by the slot, thus obviating any necessity of backing out of said pin. Fixed to said pistol-grip is a transverse pin 32, passing through and engaging the sides of the cam-slot $a$, whereby there is formed a direct and positive connection between the sliding pistol-grip and the breech-bolt, so that, as will be manifest, any movement of the pistol-grip upon the stock will impart a movement to the breech-bolt, the character of which movement will be determined by the contour of the cam-slot $a$, with which the pin 32 engages, and the contour of the upper side of the small of the stock, upon and in line with which the pin 32 travels as the bolt is moved. As shown, this cam-slot is composed of an upper curved section $d'$, a lower straight section $k$, and an intermediate straight section $d$, disposed at an angle to the latter, each of which sections causes a predetermined motion to be imparted to the breech-bolt, such motion consisting of a lifting movement due to the sections $d$ and $d'$ and a rearward movement or withdrawal due to the lower section $k$, such movements being effected by the pin 32 engaging with the rear walls of the several sections of the slot, while a reverse motion in each instance is imparted by engagement of the said pin with the front walls of the several sections of the slot, the purpose of which several distinct movements will hereinafter be clearly explained. The section $d$ is curved forward at the top part, forming the part $d'$, in order to give a maximum leverage for lifting the rear end of the bolt in case it should stick. By reference to Fig. 5 it will be seen that the pin 32 is at the lower end of the section $d$ as the toe $i$ is about to slide to the rear past its seat $j$.

The sear 44 is provided with a beveled or inclined front end, terminating at its lower extremity in a cocking-toe $e$, adapted to engage at the proper time with a recess or seat $t$, formed in the bottom of the receiver 16, such toe engaging the recess when the parts are in the positions shown in Figs. 1 and 7.

The lower side of the rear end of the sear is provided with a downwardly-extending hooked portion adapted to embrace the pin 32, as shown in Figs. 2 and 3, said hook terminating in the toe $c$, which is adapted to engage the periphery of the pin 32 at a certain time, as shown in Fig. 4, while the upper side of the rear portion of the sear terminates in a beveled or inclined surface $h$, merging into a curved surface $h'$, as shown in all the figures, which contacts with the under side of the extractor 40 or some equivalent structure, whereby the extent of rotary motion of the sear about its fulcrum 45 is controlled or regulated. The extreme forward oscillation of the sear is indicated in Figs. 6 and 7, where the straight beveled part $h$ is shown in contact with the extractor, while the extreme rearward oscillation is shown in Figs. 2 and 3 and the intermediate positions in Figs. 1, 4, and 5.

Referring now particularly to Fig. 1, it will be seen that the cocking-toe $e$ on the sear engages the seat $t$ in the fixed structure or receiver-bottom and that the locking-pin 39 is pushed forward in its slot in the extractor to illustrate the manner of locking firing-pin, and it engages the top of the projection 9 on the sear, while the rear end of the sear is pressed against a latch-tripper 35, pivotally mounted on a pin 37, which latch-tripper is pressed against the end of the sear by means of a leaf-spring 36, one end of which is secured to the latch-tripper and the other end against a stationary part, as to the upper portion of the sliding pistol-grip 30. The firing-pin lock 39, it will be seen, locks the sear, so that the gun cannot be discharged in case it is desired to load the gun and have it ready for firing, thus preventing accidental discharge of the gun in handling the same. The normal position of the pin 39 is at the rear of its slot, and it is pushed forward only when it is desired to lock the firing mechanism.

Fulcrumed on the pin 37 in juxtaposition to the latch-tripper is a latch 33, which is actuated by a spring 34, secured at its lower end to the latch and having its upper end so disposed as to engage the end of the breech-bolt 38, (see Fig. 2,) thereby causing the upper arm of the latch-tripper to occupy the position shown in Figs. 1 and 2, when the breech-bolt is closed and when the latch-tripper spring 36 is pressed rearwardly by the sear, while the lower arm seats itself in the recess 7 in the tail $u$ of the receiver, thus locking the pistol-grip in its forward position. It should be observed that the latch-spring 34 is made comparatively weak and the latch-tripper spring 36 very strong, because the latter must not only raise the latch, but overcome its spring as well. A button 33ᵃ is formed on the upper arm of the latch 33 and projects through an opening in the pistol-grip section 30, where it can be operated by the thumb or finger of the operator.

Projecting from the lower end of the latch-tripper is a toe $v$, which is adapted to contact with a shoulder $v'$ on the latch 33, (see Figs.

1, 32, and 35,) so that when the latch-tripper flies forward the shoulder v' lifts the latch.

The numeral 7 indicates a seat in the tail u for the latch 33, and the numeral 8 indicates a recess in the pistol-grip for the said latch to turn into when the latter is raised from its seat 7. The latch-tripper is held forward by its spring, tending to raise the latch and raising it except when the sear forces it to the rear. The latch-spring is permitted to seat the latch 33 as soon as the grip is moved forward to its locking position.

The trigger 46 is fulcrumed on a pin 48 and is inclosed within a perforation A through the wall of the stock, thus dispensing with any projecting guard for said trigger and affording an encasement for the exposed operating parts. A spring 47 is secured to the trigger, and its free end projects in line with the under side of the rear end of the breech-bolt 38, so that when the latter is lowered into position for locking the breech, as shown in Fig. 1, the bolt will engage and compress the spring to the proper tension for actuating the trigger when it is pulled and released. Extending upwardly from the trigger is a toe $x$, so arranged that when the trigger is pulled said toe will engage the lower side of the front end of the sear at a point slightly in rear of the cocking-toe $e$, thereby releasing the sear from the seat $t$, thus freeing the said sear, whereupon the firing-pin, upon which the sear is carried, is forced forward by a sudden impulse under the action of the mainspring 42 and fires the cartridge.

Forming a part of the trigger is an arm $y$, having a projecting toe at its rear end which is adapted to engage with the cam $w$ on the front edge of the latch-tripper 35, as shown in Fig. 2, whereby when the trigger is pulled said toe will engage and lock the latch-tripper against movement, thereby preventing the unlocking of the breech mechanism until the release of the trigger, when the latter is moved back to its normal position by the trigger-spring 47, as shown in Fig. 3.

From the rear edge of the trigger extends a toe B, which is adapted to engage the forward lower edge or toe $a'$ of the breech-bolt toe $b$ as the trigger is pulled, thus locking the said toe, and hence the breech-bolt, against any possible movement while the trigger is away from its normal position, as shown in Figs. 2 and 3.

Instead of using the spring 36 to actuate the latch-tripper 35 I may use the preferred construction shown in Fig. 35, where I form the said latch with a heavy top, as at $35^a$, thereby providing for the actuation of said latch through the recoil in unlocking the breech, the rear end of the sear being modified accordingly, as shown at $44^a$, Fig. 35. In this modification I also dispense with the use of the arm $y$ of the trigger as being unnecessary and modify the shape of the front end of the sear, for the reason that otherwise if the operator should partly open the breech and retract the sear far enough for its front end to drop into engagement with the front end of the slot $f$ in the breech-bolt, but not pull the bolt far enough to the rear to allow the sear to catch its seat $t$, and then close the breech again the sear would be forced from its engagement with the front end of the slot $f$ into the bolt, allowing the firing-pin to fly forward, snapping the primer. Therefore I form the front end of the sear with a shoulder $44^b$, so that the said shoulder will catch on the under side of the seat at the end of the groove $f$, even if the toe $c$ is not properly seated against the pin 32, and thereby prevent the breech from being closed, and this condition will clearly indicate that the firing-pin has not been cocked.

Upon the extractor 40 is a catch $z$, engaging a recess in the bolt, by which means the firing-pin, its spring and lock, sear, and extractor are all held securely on the bolt, and consequently simple removal of the catch $z$ from its recess permits ready dismantling of the firing-pin mechanism, which removal is accomplished by lifting the forward end of the extractor and then shoving it to the rear.

With the foregoing description of the parts and their relative arrangement the operation thereof will now be clearly understood, for with the parts in the position shown in Fig. 1, ready for firing, it will be observed that on pulling the trigger the toe $x$ releases the sear, whereupon said sear and firing-pin fly forward, causing the firing-pin to explode the cartridge. This forward movement of the sear would permit the latch-tripper 35 to fly forward and release the lower arm 33 from its seat 7, and thus unlock the breech mechanism at the instant of firing, were it not for the presence and position of the toe on the arm $y$, which, being formed on the trigger, moves in front of the cam $w$ of the tripper, thereby holding the latter rigidly in place as long as the finger remains on the trigger, as shown in Fig. 2. This toe, it will be seen, takes the place and performs the function of the rear end of the sear in holding the tripper back after the gun is fired and until the trigger is released by the finger and resumes its normal position, and thereby provides an efficient means for locking the breech mechanism against movement until the trigger has been released after firing. When the trigger is released after firing, its spring 47 carries it back to its normal position, thereby rotating the arm $y$ around the fulcrum-pin 48 until its toe is clear of the tripper, whereupon the latch is lifted by the action of the latch-tripper to the position shown in Fig. 3. When the construction shown in Fig. 35 is used, as is preferable, the recoil of the gun acts upon the latch-tripper, as hereinbefore indicated, and the arm $y$ is dispensed with. The gun having been fired and the finger removed from the trigger, the parts assume the position shown in Fig. 3, in which position the breech is held closed by the action of the mainspring 42, since the toe $c$ on the sear engages the pin 32, carried by the pistol-grip, and as the sear is carried by the firing-pin the tension on the mainspring, forcing the firing-pin forward, effectually holds the breech-bolt in closed position. In order to open the breech, extract the cartridge, load, and cock the firing-pin from this position, the latch 33 is tripped, the pistol-grip is pulled to the rear by the operator, and as it travels rearwardly the pin 32 travels in line with and on top of the small of the stock. During the first part of this movement the breech-bolt is raised and unlocked by the action of the upper inclined portion of the cam-slot $a$, such movement being permitted by the cut-away portion $n$ on the under side of the breech-bolt, by which provision the length of the cam-slot $a$ is reduced to a minimum, as it allows the bolt to drop down, when fully withdrawn, to a horizontal position, as shown in Fig. 6, and simultaneously with the first movement of the pin 32 in its cam-slot the sear is forced to the rear by the pin 32 acting on the toe $c$, which action tends to throw the cocking-toe $e$ of the sear downwardly against the lower side of the recess of the breech-bolt in which the firing-pin operates, and as soon as the movement of the sear rearwardly is sufficient the toe $e$ drops down through the slot $f$, and the beveled end $g$ of the sear then rests against the forward end of the slot $f$, so that as the sear drops down through the slot $f$, the beveled part $g$ being held against the forward end of the slot, the sear is caused to swing downward to its full limit through the action of the mainspring, which movement is controlled and limited by the beveled part $h$ at the rear end of the sear contacting with the under side of the extractor or other fixed structure, as shown in Figs. 5 and 7. In this swinging movement of the sear the firing-pin goes forward, but not sufficiently to permit the pin to project through the bolt, as shown in Figs. 5 and 6. It will be observed that in the second part of the unlocking movement of the breech-bolt the pin 32 travels through the intermediate portion of the cam-slot $a$, whereby the rear end of the bolt is raised, and, as shown in Fig. 5, the lifting movement unlocks the recoil-toe $i$ from the shoulder $j$, whereby the bolt is free to be moved to the rear. The final stage of the movement to the rear and downwardly is effected by the lower portion of the cam-slot, whereby the bolt assumes a horizontal position, as shown in Fig. 6, when the bolt is fully withdrawn and the breech fully opened, the rear end of the bolt traveling down from its raised to its horizontal position during the travel of the pin 32 from $m$ to $l$, Fig. 6. The extractor 40, being in engagement with the flange on the head of the cartridge, withdraws the latter as the breech-bolt moves to the rear. The bolt being now withdrawn, the next cartridge $r$ is raised by the follower $o$ in position until it strikes the flange $p$, to be forced by the breech-bolt into the chamber of the barrel, the next lower cartridge $s$ in the opposite tier to that of the cartridge $r$ being held down by the cartridge $r$ and similarly raised in turn until it strikes the flange $p$, forming the upper edge of the slot $q$, in which the guide-lips on the breech-bolt slide. The bolt is now moved forward by a movement of the pistol-grip, during which the stages of movement of the bolt in opening are performed in reverse order. The cartridge $r$ is shoved into the chamber while the cartridge $s$ is pressed down into the magazine by means of the recoil-toe $i$ and remains in position for the next loading, the breech being closed by the bolt. The flange $p$ and slot $q$ are thus made to serve a double purpose—viz., that, as hereinbefore indicated, of guiding the breech-bolt and that of controlling the upward feed of the cartridges. As the bolt is thus moved forward to closing position the toe $e$ of the sear strikes against and is retained by the seat $t$ on the receiver-bottom, thus cocking the firing-pin. The arrest of the movement of the sear by the seat $t$ causes the sear to hold its extreme rear position when the parts are ready for firing, and the continued forward movement of the bolt after the contact of the toe $e$ with the seat $t$ causes the rear end of the sear to push the latch-tripper 35 to the rear against the tension of its spring 36. At this moment the toe $v$ of the latch-tripper, being revolved forward by the action of the sear pushing the arm of the tripper backward, allows the latch-spring 34 to force the latch 33 into its seat 7, thereby completing the cycle of operation from firing to ready for firing.

By the use of a gun constructed in accordance with my invention it is evident that there are many important advantages to be derived. In the first place the direct connection between the pistol-grip and the breech-bolt insures a positive and quick action and simplifies the construction by reduction of the number of parts heretofore used for the accomplishment of the same function. The grip and its parts constitute an incasement for the rear end of the breech-bolt, and thus form a gas-deflector to prevent the escape of gas to the rear in case a primer is pierced by the firing-pin. The breech mechanism may be dismantled and assembled with ease and rapidity, for the bolt may be readily withdrawn from unlocked position by either backing out the pin 32, thus freeing it from connection with the stock, and the pistol-grip when made in sections can, it will be seen, be readily removed, thereby leaving the bolt and the locking mechanism for the pistol-grip free to be removed, or the slot $a$ when made open at its bottom permits the ready removal of the bolt and its coöperating parts. The firing-pin, mainspring, and sear can be readily removed from the extractor by slipping them down from the firing-pin collar, since the latter is in the form of a yoke with its legs straddling the firing-pin. The sear can be removed from the firing-pin by backing out the sear-pin and the firing-pin lock readily withdrawn by turning it through ninety degrees and withdrawing through slot in extractor. Moreover, as the sear is carried by the firing-pin and the latter is actuated by the mainspring and the pin 32 a special sear-spring is dispensed with, and as the cartridges are held in the magazine by the guide-lips on the receiver special holding devices for said cartridges are unnecessary, while at the same time an open space is provided for the insertion of cartridges either for single or magazine loading, and, finally, the provision of safety devices to prevent accidental discharge or accident to the gun and its mechanism is an important feature of my invention, for it will be obvious that the firing-pin is withdrawn from the face of the breech at the first movement of the breech-bolt to open the breech, and as the sear is arranged to revolve upwardly into the bolt as the latter is locked it will prevent the firing-pin from being prematurely snapped, since the toe $e$ of the sear should it slip or be unseated by any means before the breech-bolt is locked would strike the front end of the slot $f$, thus arresting the movement of the firing-pin before it could hit the primer of the cartridge, and the toe $a'$ on the part $b'$, lying in the path of movement of the toe or projection B on the trigger, keeps the latter down until the bolt is locked, thus preventing any premature pulling of the trigger, while even if the bolt should tend to lift after the trigger is pulled it would be held down by the projection B sliding over the toe $a'$, and, furthermore, the breech cannot be opened until the finger has been removed from the trigger or until the gun has been discharged, except by pressing the button 33$^a$ on the pistol-grip in rear of the bolt, and when the sear is formed as shown in Fig. 35 all the safety functions above noted are effected with the least number of parts.

I claim as my invention—

1. In a breech-loading gun, the combination with the breech and the stock, of a breech-bolt for closing the breech, a sliding grip mounted on the stock, the under part of said grip constituting a support for the fingers in opening the breech and the top part forming a rest for the thumb in closing said breech, a single positive element on said breech-bolt, and a single engaging element on said grip directly and positively connecting the said two parts in operative relation, the parts being so constructed that the removal of said engaging element will permit ready dismounting of all said parts of the gun, substantially as described.

2. In a breech-loading gun, the combination with the breech and the stock of the gun, of a breech-bolt for closing the breech, a grip slidably mounted upon the stock, direct connections connecting the bolt with the grip and arranged to impart a rising movement to the bolt to unlock the same, and a rearward and lowering movement to fully withdraw the bolt as the grip slides rearwardly on the stock.

3. In a breech-loading gun, the combination with the breech and the stock of the gun, of a breech-bolt adapted to close the breech, a pistol-grip slidably mounted on the stock, a single pin and slot carried directly by and operatively engaging the grip and the bolt, whereby movement of the grip directly controls the opening, closing and locking of the breech, the parts being so constructed that the removal of the pin will permit ready dismounting of all said parts of the gun, substantially as described.

4. In a breech-loading gun, the combination with the breech and the stock, of a breech-bolt adapted to close the breech, a grip slidably mounted upon the stock, a toe projecting downwardly from the bolt, and a single cam-slot formed therein, a single pin carried by the grip and engaging said slot, whereby movement of the grip upon the stock will cause the breech-bolt to be opened, closed and locked, substantially as described.

5. In a breech-loading gun, the combination with the breech and the stock, of a receiver on the stock and having a vertical slot therein, a breech-bolt slidably mounted in said receiver and having a toe provided with a single cam-slot extending downwardly through said vertical slot, a grip slidably mounted on said stock and having a pin engaging the said-cam slot, whereby movement of the grip will impart an opening and closing movement to the breech-bolt, substantially as described.

6. In a breech-loading gun, the combination with the breech and the stock, of a receiver having a slotted bottom secured to the stock, a breech-bolt slidably mounted in said receiver and having a downwardly-projected toe passing through the slot in the bottom of the receiver, and provided with a cam-slot, a recoil-toe rigid on said bolt adapted to engage with the stock when the breech is closed, a grip slidably mounted on the stock and provided with a pin engaging the cam-slot, whereby movement of the grip imparts a positive movement to the bolt for disengaging the recoil-toe and for opening and closing the breech, substantially as described.

7. In a breech-loading gun, the combination with the breech and the stock, of a breech-bolt adapted to close the breech, a recoil-toe rigid on said bolt adapted to engage the fixed structure when the bolt closes the breech, a grip slidably mounted on said stock, the under part of said grip forming a support for the fingers in opening the breech and the upper part a rest for the thumb in closing the same, and a direct connection between the grip and the bolt, whereby movement of the grip upon the stock imparts movement to the bolt for disengaging the toe and opening and closing the breech, the parts being so constructed that the removal of the direct connection between the grip and bolt will permit ready dismounting of all said parts of the gun, substantially as described.

8. In a breech-loading gun, the combination with the breech and the stock, of a receiver in the stock having a slotted bottom, a breech-bolt slidably mounted on said receiver and having a toe provided with a cam-slot and extending downwardly through the slot in the bottom of the receiver, a grip slidably mounted on the stock and provided with a pin engaging said cam-slot, a sear carried by the bolt and having a toe at its forward end resting on the bottom of the receiver when the breech is closed, a shoulder formed at the forward end of the slot in the receiver-bottom, with which said toe is adapted to engage when the bolt is moved to the rear, and means for holding the breech-bolt in closed position, substantially as described.

9. In a breech-loading gun, the combination with the breech and stock, of a breech-bolt having a bore slidably mounted on the stock and adapted to close the breech, a firing-pin slidably mounted in the bore of the bolt, a sear fulcrumed on the firing-pin within the bore of the bolt and having a cocking-toe adapted to engage a fixed part when the breech-bolt is withdrawn, trigger mechanism controlling the sear, and a spring adapted to actuate the firing-pin when the sear is released, a grip slidably mounted on the stock and having a direct connection with the bolt, whereby the bolt is moved for closing and opening the breech by sliding movement of the grip on the stock, substantially as described.

10. In a breech-loading gun, the combination with the breech and the stock, of a receiver in said stock having grooves in its sides, a breech-bolt slidably mounted therein and having guide-lips thereon adapted to engage the said grooves in the sliding movement of the bolt, a recoil-toe on the bolt adapted to hold the bolt against recoil when the breech is closed, a firing-pin and sear carried by the bolt, a spring having one end engaging the firing-pin, trigger mechanism controlling the sear, an extractor secured to the breech-bolt and carrying an abutment for the other end of said spring and holding the parts together, and means for sliding the bolt to open and close the breech, substantially as described.

11. In a breech-loading gun, the combination with the breech and the stock, of a breech-bolt provided with a central bore, slidably mounted on the stock, a firing-pin slidably mounted in the said bore, a sear fulcrumed on the firing-pin, a spring for actuating the firing-pin, an extractor secured to the bolt and having a toe engaging the bolt, a yoke carried by the extractor and embracing the firing-pin, and forming an abutment for the rear end of the spring, whereby all the parts can be readily assembled and dismantled, substantially as described.

12. In a breech-loading gun, the combination with the breech and the stock, of a breech-bolt provided with a central bore, slidably mounted on the stock, a firing-pin slidably mounted in the said bore, a sear fulcrumed on the firing-pin, a spring for actuating the firing-pin, an extractor mounted on the bolt and having a part engaging the bolt, a yoke carried by the extractor and embracing the firing-pin, and forming an abutment for the rear end of the spring, whereby all the parts can be readily assembled and dismantled, substantially as described.

13. In a breech-loading gun, the combination with the breech and the stock, of a breech-bolt slidably mounted on the stock and having a central bore, a firing-pin slidably mounted in said bore, a sear carried by the firing-pin, a grip slidably mounted on said stock, a single pin-and-slot connection between the grip and bolt for imparting opening, closing and locking movements to the bolt as the grip is moved on the stock, the construction being such that the removal of said pin will readily permit the dismounting of all of said parts from the gun, substantially as described.

14. In a breech-loading gun, the combination with the breech and the stock, of a breech-bolt slidably mounted on the stock, a grip formed in two sections joined together by a dovetailed connection, a pin in the grip, and cam-slot on the bolt with which said pin engages for imparting the necessary movements to the bolt for opening and closing the breech, whereby removal of the pin from the grip releases the bolt for ready removal, and permits separation of the grip-sections, substantially as described.

15. In a breech-loading gun, the combination with the breech and the stock, of a breech-bolt slidably mounted thereon, a grip formed of two sections united by dovetailed connection, pins passing through said sections, a recess in one section adjacent to the pins, a locking-bar in said recess for locking the two parts together, a pin on the grip, and a cam-slot on the bolt with which said pin engages, substantially as described.

16. In a breech-loading gun, the combination with the breech and the stock, of a breech-bolt slidably mounted on the stock, a grip slidably mounted on the stock and formed of two sections having dovetailed connections, a stop on one section to limit the forward sliding movement of said section on the other, a locking device for locking the sections together when adjusted, a pin carried by the grip and engaging the bolt for operating the latter, substantially as described.

17. In a breech-loading gun, the combination with the breech and the stock, of a breech-bolt adapted to close the breech, a recoil-toe on the breech-bolt adapted to engage a shoulder on the fixed structure, a toe extending downwardly from said bolt having a cam-slot therein, a sliding grip on the stock having a pin engaging said slot, a locking device situated directly in rear of the breech-bolt adapted to lock the said grip in closed position against rearward movement, substantially as described.

18. In a breech-loading gun, the combination with the breech and the stock, of a breech-bolt slidably mounted on the stock, a grip slidably mounted on said stock, a latch situated directly in rear of the bolt and having a spring-actuated arm engaged by a fixed part on the breech-bolt, and a toe adapted to engage the fixed structure when the bolt closes the breech-bolt, and thereby lock said breech in closed position, substantially as described.

19. In a breech-loading gun, the combination with the breech and the stock, of a sliding bolt on the stock, means for moving said bolt, a latch device situated directly in the rear of the breech-bolt and adapted to engage the bolt when closed, a locking-toe on said latch and a recess on the fixed structure with which said toe is adapted to engage when the bolt is closed, substantially as described.

20. In a breech-loading gun, the combination with the breech and the stock, of a breech-bolt slidably mounted on the stock, a firing-pin and sear carried by the said bolt, trigger mechanism controlling the sear, a sliding grip on the stock, a latch pivotally supported on the grip in rear of the breech-bolt and having a toe engaging a recess in the fixed structure when the bolt closes the breech, a latch-tripper controlling the latch and situated in the line of movement of the sear as the bolt moves with the same, a cam connection between the grip and the bolt for moving the latter, substantially as described.

21. In a breech-loading gun, the combination with the breech and the stock, of a breech-bolt for closing the breech, slidably mounted on the stock, a firing-pin, and a sear carried by said firing-pin having a cocking-toe adapted to engage the fixed structure, a trigger mechanism controlling said sear and adapted to release the sear to allow the firing-pin to operate, mechanism for operating the bolt, and means operating in conjunction with the sear to prevent the firing-pin from firing movement at any time before the sear reaches cocking position, substantially as described.

22. In a breech-loading gun, the combination with the breech and the stock, of a breech-bolt slidably mounted on the stock, a firing-pin carried by the bolt, trigger mechanism, a sear carried by the firing-pin and having a cocking-toe, means for imparting a forward movement to the firing-pin, a shoulder on the fixed structure for engaging the sear to cock the firing-pin mechanism, a seat on the breech-bolt, a shoulder on the sear adapted to engage said seat in case the sear has not been moved far enough to permit its cocking-toe to engage its seat, and means for moving the breech-bolt, substantially as described.

23. In a breech-loading gun, the combination with the breech and the stock, of a breech-bolt slidably mounted on the stock, mechanism for moving the bolt to open and close the breech, trigger mechanism, a firing-pin, and a sear coöperating with the trigger mechanism, and means on the trigger coöperating with a part on the receiver and with the bolt adapted to lock the bolt to the receiver to prevent opening movement of the bolt until the said trigger has been released, substantially as described.

24. In a breech-loading gun, the combination with the breech and the stock, of a breech-bolt slidably mounted on the stock, means for operating said bolt, a trigger having a projecting toe, and means coöperating therewith while the bolt is unlocked, adapted to lock said trigger against firing movement at such time, and also coöperating therewith during the firing movement of the trigger to prevent the bolt from rising to unlock, substantially as described.

25. In a breech-loading gun, the combination with the breech and the stock, of a breech-bolt slidably mounted on the stock, a toe on said bolt, means for operating the bolt, a trigger having a projecting toe adapted to engage the toe on the bolt while the bolt is unlocked, whereby the trigger is locked against movement at such time, subtantially as described.

26. In a breech-loading gun, the combination with the breech, the stock and a receiver mounted on the stock and having a shoulder, of a breech-bolt for closing the breech having a central bore and a seat therein, a firing-pin, operating in the bore, a slot in said firing-pin a sear pivotally supported therein and having a cocking-toe adapted to engage said shoulder in the receiver, means for operating the bolt, said sear being constructed to swing into the slot of the firing-pin as the breech is closed and to engage the bolt structure, thereby preventing the firing-pin from accidental release until the bolt is locked, substantially as described.

27. In a breech-loading gun, the combination with the breech and the stock, of a breech-bolt slidably mounted on the stock, mechanism for operating the bolt, a trigger and devices coöperating therewith to fire the gun, a projecting toe on the bolt, and a toe on the trigger adapted to engage the said toe on the bolt to lock the trigger against action until the breech is entirely closed and to prevent the bolt from rising as the trigger is pulled, substantially as described.

28. In a breech-loading gun, the combination with the breech and the stock, of a breech-bolt slidably mounted on the stock, a firing-pin slidably mounted on the breech-bolt, a sear pivotally mounted on the firing-pin, a cocking-toe at the front end and a projection on the upper part, a locking-pin adjustably mounted on the bolt structure and adapted to engage said projection to lock the sear down, a shoulder for the cocking-toe, a trigger adapted to release the sear from its cocking position, and means for moving the bolt and engaging the sear to move it rearwardly to cocking position after firing, substantially as described.

29. In a breech-loading gun, the combination with the breech and the stock, of a breech-bolt slidably mounted on the stock, a firing-pin slidably mounted on the bolt and having a spring for actuating the same, a sear pivotally mounted in a slot in the firing-pin, and having a cocking-toe, a shoulder on the fixed structure for engagement with said toe, a beveled portion at the upper side of the sear adapted to engage a fixed part on the bolt, and an inclined forward portion adapted to engage a fixed part on the bolt as the bolt moves rearwardly, and means for retracting the firing-pin and swinging down the end of the sear, whereby the sear is rotated about its pivot as the bolt moves rearwardly, and such rotation is limited by contact of the beveled portion with its fixed coöperating part, substantially as described.

30. In a breech-loading gun, the combination with the breech and the stock, of a breech-bolt slidably mounted on the stock, a grip slidably mounted on the stock, a positive connection between the breech-bolt and the grip, a latch pivoted on the grip in the rear of the bolt and adapted to engage a fixed part on the stock, a trigger mechanism and a firing-pin, and means controlled by the trigger for holding the bolt locked until the trigger is released, substantially as described.

31. In a magazine-gun, the combination with the breech, the stock and the magazine, of a receiver having a slotted bottom through which the cartridges are fed upwardly into line for loading, a breech-bolt having guide-lips slidably mounted in said receiver, mechanism for operating the same, flanges flanking the slot in the bottom of the receiver over the magazine acting as guides for the breech-bolt and also adapted to engage the uppermost cartridge of each tier in succession and to guide the breech-bolt by engagement with the guide-lips thereon, substantially as described.

32. In a breech-loading gun, the combination with the breech and the stock, of a breech-bolt slidably mounted on the stock, a firing-pin slidably mounted on the bolt, a sear pivotally supported thereon, a latch mechanism located directly in rear of the sear and having its arm in contact with and covering the rear end of the sear, a grip slidably mounted upon the stock and inclosing the latch mechanism and rear end of breech-bolt and sear, whereby a gas check or deflector to prevent escape of gas to the rear is provided, substantially as described.

33. In a breech-loading gun, the combination with the breech and the stock, of a breech-bolt for closing the breech, a latch mechanism situated in rear of the bolt, a grip mounted upon the stock and inclosing the latch mechanism, a device on the trigger for holding the bolt locked until the trigger is released, and a button or projection on the latch mechanism extending into an opening in the grip, whereby the said latch mechanism may be operated when desired to release the bolt, substantially as described.

34. In a breech-loading gun, the combination with the breech and the stock, of a receiver having a slotted bottom, a breech-bolt having a central bolt and slotted rear portions, a firing-pin mounted in the said bore, a sear pivotally supported on said firing-pin, and having a cocking-toe adapted to engage a seat on the receiver-bottom when the bolt is moved to the rear, and a hook on its rear end, a grip slidably mounted upon the stock, a toe on the bolt having a cam-slot, a pin on the grip engaging said slot, said pin adapted to engage the hook on the sear when the grip moves rearwardly, an extractor secured to the upper side of the bolt, a locking-pin passing through said extractor for locking the sear down, and a trigger mechanism for releasing the sear from its seat, substantially as described.

In testimony whereof I have signed my name to this specification in the presence of two subscribing witnesses.

GEORGE L. SMITH.

Witnesses:
D. V. CRADWICK.
H. W. JONES.